(12) United States Patent
Chandler

(10) Patent No.: US 8,898,207 B2
(45) Date of Patent: Nov. 25, 2014

(54) SPECIFYING OPTIONS IN FILENAMES AND MULTIPLEXING THE OPTIONS ONTO FILE ACCESS OPERATIONS OF A FILE SYSTEM

(75) Inventor: Allan T. Chandler, Floreat (AU)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/211,371

(22) Filed: Aug. 17, 2011

(65) Prior Publication Data

US 2013/0046801 A1 Feb. 21, 2013

(51) Int. Cl.
*G06F 17/30* (2006.01)
(52) U.S. Cl.
CPC .................. *G06F 17/30115* (2013.01)
USPC ............................ 707/822; 707/812; 707/823
(58) Field of Classification Search
USPC .......................................... 707/812, 822–823
See application file for complete search history.

(56) References Cited

U.S. PATENT DOCUMENTS

| | | | |
|---|---|---|---|
| 6,594,675 B1 | 7/2003 | Schneider | |
| 7,676,813 B2 | 3/2010 | Bisset et al. | |
| 2006/0253497 A1 | 11/2006 | Abali et al. | |
| 2008/0294598 A1* | 11/2008 | Imai | 707/2 |
| 2010/0318820 A1* | 12/2010 | Dickens et al. | 713/310 |
| 2011/0093471 A1* | 4/2011 | Brockway et al. | 707/747 |

* cited by examiner

*Primary Examiner* — Monica Pyo
(74) *Attorney, Agent, or Firm* — Stephen J. Walder, Jr.; William J. Stock

(57) ABSTRACT

Mechanisms are provided for accessing a file of a physical storage device of a data processing system via an intelligent file system associated with the physical storage device. The mechanisms receive, in the intelligent file system of the data processing system, a file access command specifying a file access operation and an extended filename. The extended filename comprises a full filename and one or more options multiplexed with the full filename. The mechanisms parse the file access command to identify the file access operation, the full filename, and the one or more options. The mechanisms then execute the file access operation on a file of the physical storage device corresponding to the full filename using the one or more options specified in the extended filename.

18 Claims, 3 Drawing Sheets

SPECIFYING OPTIONS IN FILENAMES AND MULTIPLEXING THE OPTIONS ONTO FILE ACCESS OPERATIONS OF A FILE SYSTEM

BACKGROUND

The present application relates generally to an improved data processing apparatus and method and more specifically to mechanisms for specifying options in filenames and multiplexing those options onto file access operations of a file system.

File systems are an integral part of modern computing systems. The file system represents a place where files are stored and provides a mechanism by which these files may be accessed. The file system can be local to a computing system, remotely located from the computing system, i.e. provided on a different computing system, such as in the case of storage area networks (SANs) and the like, or even distributed across a plurality of computing systems with parts of the file system and its corresponding files existing on different computing systems.

Regardless of the particular type or implementation of a file system, there is one common characteristic of file systems which is that all file systems allow users, applications on the computer system, the operating system of the computing system, and the like, to access files based on the use of a filename and optionally a file location. For example, a local file system of a LINUX® operating system can have a file with a filename /etc/passwd, which is the "passwd" file in the "etc" directory (file location). Similarly, /home/george/profile is the file named "profile" in the "george" directory, which itself is in the "home" directory. In this case, /home/george/profile can be described as the full filename since it comprises the full path (/home/george/) and the filename (profile).

A networked file system may have a file common:/tmp/xyz.txt, which is the "xyz.txt" file in the "tmp" directory on the "common" computing system. In the Microsoft® Windows® operating system a file c:\io.sys is the "io.sys" file in the top level directory of the "c:" drive of the computing system.

The illustrative embodiments described hereafter are directed to an improvement in the use of filenames with file systems to access files.

SUMMARY

In one illustrative embodiment, a method, in a data processing system, is provided for accessing a file of a physical storage device of the data processing system via an intelligent file system associated with the physical storage device. The method comprises receiving, in the intelligent file system of the data processing system, a file access command specifying a file access operation and an extended filename. The extended filename comprises a full filename and one or more options multiplexed with the full filename. The method further comprises parsing, by the intelligent file system, the file access command to identify the file access operation, the full filename, and the one or more options. Furthermore, the method comprises executing, by the intelligent file system, the file access operation on a file of the physical storage device corresponding to the full filename using the one or more options specified in the extended filename.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
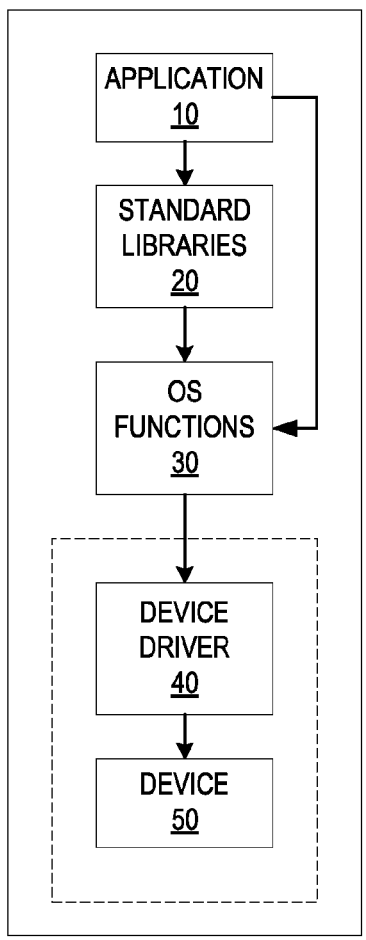
FIG. 1A is an example diagram illustrating software layers for accessing files of a file system.

The illustrative embodiments provide mechanisms for multiplexing options onto file access operations. The mechanisms of the illustrative embodiments multiplex options to be used when accessing a file, e.g., open, create, delete, rename, etc., with the actual filename itself. In some illustrative embodiments, this functionality is built into the file system itself or is an extension of the file system.

As discussed above, file systems are an integral part of modern computing systems and are the primary mechanism through which access to data is achieved. However, operating systems tend to provide a fairly limited standardized mechanism for creating or opening the files of a file system, e.g., using a simple application programming interface (API) call like the ISO C99 "open(filespec, options)" where the "filespec" is the full filename of the file to be opened and the "options" are usually simple fixed options from a predefined set of options recognized by the API (such as open for read, write, or both), and an initial position of the file pointer, there is no portable way to provide for more complicated options. That is, the ISO standard only allows one to open a filename in a specific mode, e.g., read, write, append, update, and that is all. There is no ability to expand upon this very limited and small set of options.

For example, the ISO C99 fopen( ) call is used for opening files and takes the form FILE *fileHandle=fopen("myfile.txt", "r+") where the "r+" is a mode option that specifies "read and update." However, because the ISO standard mandates that one can only have two arguments with the fopen( ) call, i.e. the filename and mode, and limits the allowed mode designators, the options for performing functionality with the fopen( ) call are significantly limited.

Current solutions to this issue of limited options during file access operations invariably involve creating and using "non-standard" API calls. The term "standard" refers to conforming with the ISO C standard which has the limited mode argument issue described above. A "non-standard" API call thus refers to operating system specific calls which are not portable across operating system implementations. An example of a non-standard API is the Microsoft Windows API called CreateFile:

```
HANDLE WINAPI      CreateFile(
    _in            LPCTSTR lpFileName,
    _in            DWORD dwDesiredAccess,
    _in            DWORD dwShareMode,
    _in_opt        LPSECURITY_ATTRIBUTES
                   lpSecurityAttributes,
    _in            DWORD dwCreationDisposition,
    _in            DWORD dwFlagsAndAttributes,
    _in_opt        HANDLE hTemplateFile
);
```

As can be seen from the complexity of the description, using non-standard APIs allows for extra details to be specified. However, it is neither standard nor amenable to easy expansion if, for example, the underlying file system provides a feature that was not anticipated. That is, the problem with non-standard APIs is that there is no standard way to use non-standard functionality provided by a file system. The non-standard APIs are specific to a particular operating system and cannot be used with other operating systems and do not allow easy expansion, i.e. the range of possible actions that can be performed by the API is limited to what was known at the time the API was created since the API is associated with the operating system, not the file system.

FIG. 1A is an example diagram illustrating software layers for accessing files of a file system. As shown in FIG. 1A, an application 10 can either use standard features of the ISO C standard by accessing C standard libraries 20 with features limited to those provided by the standard, or the application 10 can call an operating system function 30 directly which is less limited but still only allows functionality and options that the operating system knows about. The call to either the library 20 or the operating system 30 results in the called software accessing the corresponding device driver software 40 which is then used to access the actual device 50, e.g., the storage device or the like upon which the file system is implemented. With this arrangement, the functionality that the application 10 can implement when accessing the files in the file system on the device 50 is limited to whatever the ISO C standard library 20 allows or what the operating system 30 is aware of at the time it was implemented.

The mechanisms of the illustrative embodiments multiplex options onto the filename which allows the mechanisms of the illustrative embodiments to be utilized with legacy systems while providing an ability to expand the functionality and options that can be used with the accessing of files of a file system. With the mechanisms of the illustrative embodiments, rather than the options and functionality being limited to what is known at the C standard library 20 or the operating system 30, the options multiplexed onto the filename may be passed all the way down to the device driver level 40. The device driver 40 receives the filename with the options multiplexed on the filename and extracts the options so as to act on them. The device driver 40 is intimately acquainted with the functionality of the device 50 and its file system (as represented by the dashed box around the device driver 40 and the device 50). Thus, functionality that is supported by the device 50, of which the ISO C standard libraries 20 and operating system 30 are not aware or which is not supported by the ISO C standard libraries 20 and operating system 30, may be invoked using the mechanisms of the illustrative embodiments.

The multiplexing of the options onto the filename in the manner of the illustrative embodiments does not violate the ISO C standard since the filename in the ISO C standard is arbitrary. Thus, neither the ISO C standard nor the operating system implemented functionality or recognized options need to be changed with the mechanisms of the illustrative embodiments. The mechanisms of the illustrative embodiments bypass the ISO C standard and operating system implementation by allowing the invoking of options and functionality to be passed to the device driver level via the multiplexing of these options and functionality onto the filename passed to the device driver. Since the ISO C standard and the operating system implementation are bypassed by the mechanisms of the illustrative embodiments, functions/options supported by the file system which are not recognized in the standard or by the operating system implementation may still be invoked using the mechanisms of the illustrative embodiments. Moreover, changes to the functionality of the file system may be made without changing the ISO C standard or operating system implementation and the functionality associated with these changes may still be invoked by the mechanisms of the illustrative embodiments, thereby providing an ability to expand the functionality of the file system. In addition, the applications and users themselves can choose options to be used with the accessing of files simply by changing the filename being opened (e.g., prefixing the filename with options).

Thus, the mechanisms of the illustrative embodiments, which may be provided as part of a file system, an extension of the file system, or the like, receive a file access command that comprises an access command identifier (e.g., open, create, delete, rename, etc.) and an extended filename defined in accordance with the illustrative embodiments. The extended filename is a combination of the full filename (e.g., either the name of the file by itself or a combination of the full path and name of the file depending on the situation) and a set of option identifier strings specifying options to be used with the accessing of the file. The options may be specified in the extended filename such that they are separated from the full filename and other options by way of a separator character that cannot be part of the full filename and/or the option identifier strings. Of course other mechanisms other than separator characters can be used as may become apparent to those of ordinary skill in the art in view of this description, without departing from the spirit and scope of the illustrative embodiments. The key concept here is that any mechanisms that allows the full filename and the options to be distinguished from each other may be used with the mechanisms of the illustrative embodiments.

When receiving the file access command, the mechanisms of the illustrative embodiments parse the extended filename based on the separator characters. The mechanisms of the illustrative embodiments may then utilize the options identified from the extended filename to perform the requested access operation, as specified by the file access command, on the file specified in the full filename portion of the extended filename.

With the mechanisms of the illustrative embodiments, by multiplexing options onto the filename itself to generate an extended filename, applications may use standard application programming interfaces (APIs), such as ISO C fopen( ) calls or the like, to access files within a file system while still allowing for a different extra configurable options, both those anticipated now and those yet to be anticipated. Thus, one does not need to generate non-standard APIs to perform the file access operations with added options. A standard API may be used to perform an operation on a file specified as an extended filename in accordance with the mechanisms of the illustrative embodiments, and the mechanisms provided herein are able to parse the extended filename, determine the options specified therein, and implement those options when performing the file access operation specified by the standard API call.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

Figure 1B:
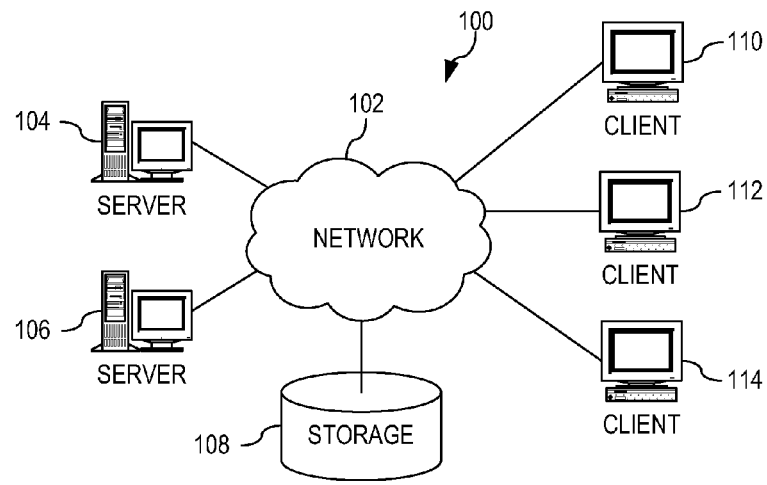
FIG. 1B is an example block diagram of a data processing system in which aspects of the illustrative embodiments may be implemented.
Figure 2:
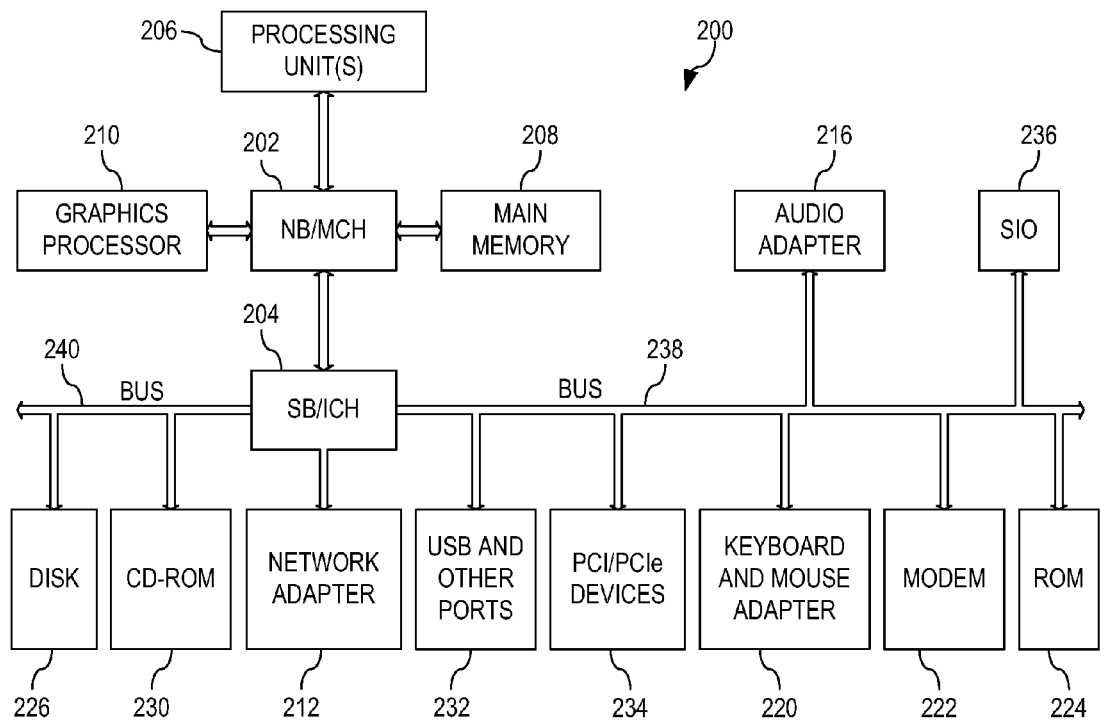
FIG. 2 is an example block diagram of a computing device in which aspects of the illustrative embodiments may be implemented.

FIG. 1B depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As will be appreciated by those of ordinary skill in the art, a file system may be provided in either one of the data processing system environments depicted in FIGS. 1 and 2 above. The file system may be distributed across a plurality of computing devices, such as servers 104, 106, a network attached storage device 108, such as in the case of a storage area network (SAN), or the like. As such, a client device, such as clients 110, 112, and 114, may access the file system remotely via the network 102. Moreover, the file system may be housed completely within a single computing device, such as data processing system 200 in FIG. 2. The mechanisms of the illustrative embodiments may be implemented with regard to any such file system, whether it be distributed, remotely accessed, or local to a client or stand-alone computing device.

As discussed above, the illustrative embodiments augment the functionality of a file system (distributed, remotely accessed, local, or the like), by providing mechanisms for using extended filenames. The extended filename is a combination of the full filename (e.g., either the name of the file by itself or a combination of the full path and name of the file depending on the situation) and a set of option identifier strings specifying options to be used with the accessing of the file. The options may be specified in the extended filename such that they are separated from the full filename and other options by way of a separator character that cannot be part of the full filename and/or the option identifier strings.

For example, an extended filename may be of the type "myfile.txt:backup-first" where the full filename "myfile.txt" is specified first, followed by a separator character ":", and then followed by one or more option identifier strings such as "backup-first." This is just one example of an extended filename in which the full filename is specified first followed by the option identifier strings. In such a case, the separator character may be any character that is not permitted to be part of the full filename, e.g., #, %, a space, or the like. This is to facilitate the parsing of the extended filename by the mechanisms of the illustrative embodiments so that the full filename and the individual option identifier strings may be separately distinguished.

In an alternative embodiment, the option identifier strings may be specified first followed by the full filename. For example, an extended filename may be of the type "[backup-first, backup-limit=5]myfile.txt" in which case the string "[backup-first, backup-limit=5]" represents the option identifier string and "myfile.txt" represents the full filename. In this case, the option identifier string is separated from the full filename by the fact that the option identifier string is enclosed in square brackets at the start of the extended filename. Many different ways of specifying the extended filename as a combination of the full filename and the option identifier strings separated by separator characters may be used without departing from the spirit and scope of the illustrative embodiments. Moreover, the particular separator character, or combination of characters, may take many different forms without departing from the spirit and scope of the illustrative embodiments as long as they may be used to distinguish between parts of the extended filename, i.e. the full filename and the various option identifier strings.

When receiving the file access command, the mechanisms of the illustrative embodiments parse the file access command to identify the access operation to be performed and the extended filename. In addition, the mechanisms of the illustrative embodiments parse the extended filename based on the separator characters to identify the full filename and the one or more options specified by option identifier strings in the extended filename. The mechanisms of the illustrative embodiments may then correlate the option identifier strings with option code provided in the file system for performing various optional functions in conjunction with the access operation on the specified file.

It should be noted that in this scenario, the file access command may be a standard or non-standard command supported by the operating system, file system, or the like. For example, the file access command may be a standard or non-standard API call made to the operating system which may then pass the file access command to the file system. While the file access command itself may be standard or non-standard, the filename specified in the file access command complies with the extended filename of the illustrative embodiments and thus, may specify one or more options within the filename itself, i.e. the option identifier strings are multiplexed onto the full filename. In this way, existing standard and non-standard commands may make use of the mechanisms of the illustrative embodiments without modification to these standard or non-standard commands. Furthermore, the mechanisms of the illustrative embodiments, in many cases, eliminates the need to generate non-standard access commands, e.g., non-standard API calls, since the options for which such non-standard access commands are generated may be specified in the extended filename of the illustrative embodiments. However, the illustrative embodiments may be used with either or both of standard and non-standard API calls without departing from the spirit and scope of the illustrative embodiments.

Figure 3:
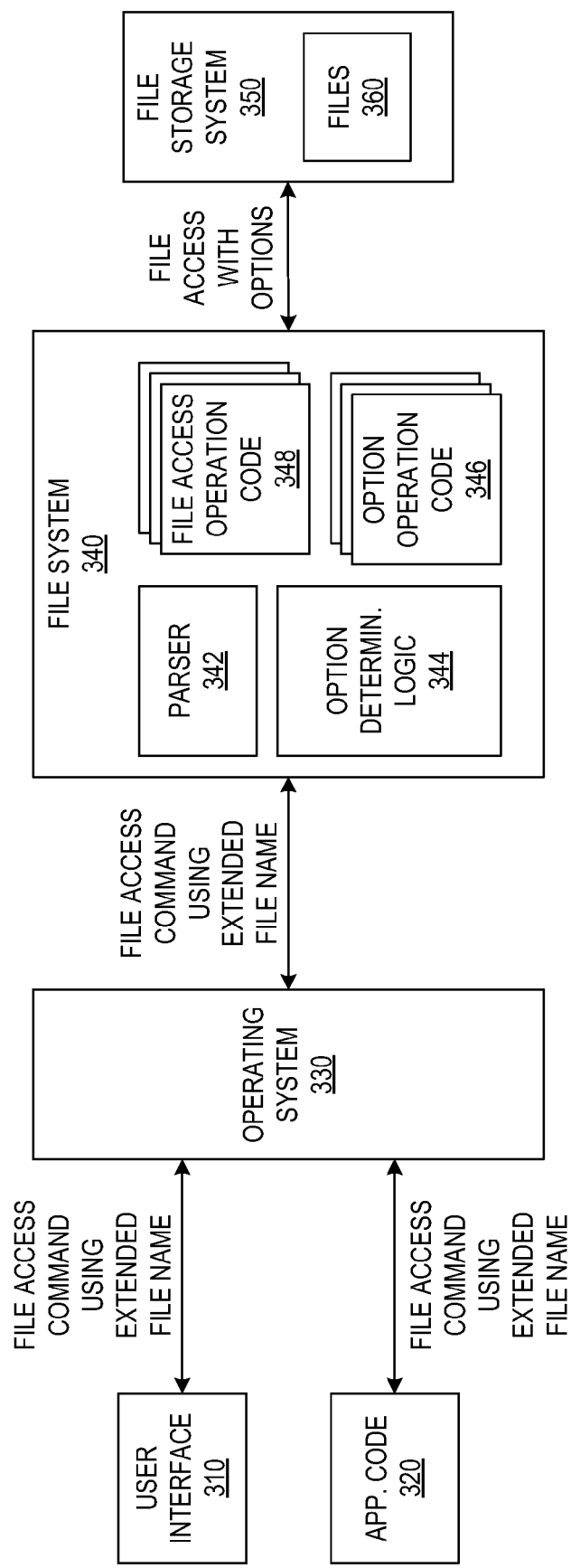
FIG. 3 is an example block diagram illustrating a file system access operation being performed using filename and option multiplexing mechanisms in accordance with one illustrative embodiment.

FIG. 3 is an example block diagram illustrating a file system access operation being performed using filename and option multiplexing mechanisms in accordance with one illustrative embodiment. As shown in FIG. 3, there may be various mechanisms provided in a computing system for entering file access commands for accessing the contents of a file 360 stored in a file storage system 350, which is comprised of one or more physical storage devices, e.g., hard disks, optical disks, flash memory devices, virtual storage devices backed by physical storage device, or the like. For example, a user may input a file access command directly to the operating system via a user interface 310, e.g., command line prompt, or the like. Alternatively, application code 320 may submit the file access command in an automatic manner as the application code 320 executes, such as by using application program interfaces (APIs) associated with the operating system or the like. Essentially, file access commands may be submitted to the operating system 330 in any known or later developed manner with the difference between the mechanisms of the illustrative embodiments and these known mechanisms being that the file access command utilizes the extended filename of the illustrative embodiments which is recognizable and able to be processed by the intelligent file system 340 in the manner described hereafter.

The file access command may be specified using either a standard or non-standard format. That is, if the file access command is submitted as an API call, for example, the API call may be to a standard API recognized by the operating system 330 or it may be a customized or non-standard API that is user generated, for example, and provided to the operating system, such as in a library or the like. Alternatively, the user may input the file access command via a command prompt or other such user interface 310.

The operating system 330 receives the file access command including the extended filename in accordance with the mechanisms of the illustrative embodiments and either passes the file access command to the intelligent file system 340 directly or performs some processing on the file access command to generate a corresponding file access command that is sent to the intelligent file system 340. In either case, the file access command that is sent to the intelligent file system 340 comprises an identification of the access operation to be performed and the extended filename in accordance with the illustrative embodiments. It should be noted that the extended filename of the illustrative embodiments meets established standards and operating system standards such that it is passed without error to the file system 340.

The intelligent file system 340 receives the file access command and parses the file access command using the parser 342. It should be appreciated that the functionality of the intelligent file system 340 as described herein may be performed, for example, at a device driver level, i.e. below the standard library and operating system level (see FIG. 1A previously). As noted above, this allows for greater functionality of the file system 340 to be invoked using the mechanisms of the illustrative embodiments without having to modify the ISO C standard libraries or the implementation of the operating system.

The parser 342 identifies the access operation identifier in the file access command and the extended filename. The parser 342 also parses the extended filename to determine if there are any options specified in the extended filename. If there are options specified in the extended filename, the options are separately distinguished from the full filename and other options specified in the extended filename. This can be done by recognizing separator characters in the extended filename and knowing the particular convention used by the intelligent file system 340 for specifying extended filenames, e.g., full filename first followed by options or options specified first followed by full filename. Thus, the parser 342 identifies the particular parts of the file access command, i.e. the access operation identifier string and the extended filename string, and also identifies the particular parts of the extended filename, i.e. the full filename string, the option identifier strings, if any, and optionally the parameters for the option in the option identifier strings.

The option identifier strings are passed by the parser 342 to the option determination logic 344 which determines which option code 346 corresponds to the option identifier strings identified in the parsed file access command. The intelligent file system 340 then utilizes the identified option code 346 to perform the specified file access operation (specified by the access operation identifier string and correlated with the file access code 348 by the file system 340) using the options corresponding to the identified option code 346. The order in which to perform the options is implicit in the implementation of the option code 346 in the file system 340. For example, an option of the type "[backup=myfile.txt.bkp]myfile.txt" would be executed before a file is opened. However, an option of the type [convert=ascii_to_ebcdic]myfile.txt would flag the file so that reads on this file would subsequently convert the data from ASCII to EBCDIC encoding. As yet another example, an option of the type "[mailto=johnsmith@somewhere.com]myfile.txt" would attempt to mail the file to the identified recipient via electronic mail automatically when the file is closed. Thus, the particular order in which options are performed with regard to each other and the accessing of the file is implementation specific.

The option code 346 may be executed using parameters specified in the option identifier string of the extended filename, if any. For example, in the above example of a file access command being "[backup-first, backup-limit=5]myfile.txt", the parameter "backup-limit=5" may be used to control the operation of the option code 346 as it is a parameter passed to this option code 346. The file access operation is performed on a corresponding file 360 in the file storage system 350, the particular file 360 being specified in the extended filename as the full filename portion.

By way of example, assume that there is a storage area network that utilizes a distributed file system, such as file system 340, that has the optional code for automatically backing up files before allowing a user or application to access the files. This can be a very useful feature for preventing corruption of data in the storage area network or at least allowing easy recovery after corruption has occurred. Since the filename is passed to the file system 340 intact, i.e. it is not changed or manipulated in any way by the operating system 330 when sending a file access command from the user interface 310 or application 320 to the file system 340, the extended filename of the illustrative embodiments is passed to the file system 340 intact. As a result, the mechanisms of the illustrative embodiments add extra information to the filename, to thereby make it an "extended" filename, which can be used to specify use of this optional feature of the file system 340. That is, a separate API or file access command does not need to be generated to invoke this optional feature of the file system 340 and standard or pre-existing non-standard APIs or file access commands may be utilized with the optional functionality of the file system 340 being invoked by virtue of the option being specified in the extended filename, i.e. the option being multiplexed onto the full filename. In this example, the backup functionality of the file system 340 may be invoked by specifying the option identifier for the backup functionality in the extended filename along with any parameters that may be used by that backup functionality.

Prior to the present invention, in order to backup a file prior to accessing the file, one would have to either input the following commands via a user interface or otherwise provide a non-standard API that would perform equivalent operations:

```
open "/dir/xyz.txt" for input as infile
open "/dir/xyz.txt-backup" for output as outfile
while not infile.end_of_file( ):
    block = infile.getblock( )
    outfile.putblock(block)
outfile.close( )
infile.close( )
if error occurred:
    return error
open "/dir/xyz.txt" for input/output as iofile
```

Only after performing the above operations can one be assured that they have a backup of the file that is to be accessed and one can safely write to the file being accessed.

With the mechanisms of the illustrative embodiments, the same functionality can be achieved using an intelligent file system 340 that extracts the necessary option for backup a file from the extended filename itself. For example, a file access command such as the following can be used with the mechanisms of the illustrative embodiments to achieve a same outcome as the operations listed above:

open "[backup, suffix='-backup']/dir/xyz.txt" for input/output as iofile

Using such a file access command, the intelligent file system 340 of the illustrative embodiments performs the desired access operation on the file "/dir/xyz.txt" after performing a backup operation on the file "/dir/xyz.txt" and storing the backup file as "/dir/xyz.txt-backup." Thus, one does not have to specifically set forth, either by way of user input or application invoking a non-standard API, the various operations for performing the backup operation and instead can simply use a standard interface, such as ISO C fopen( ) or the like, and specify the options within the extended filename itself.

It should be noted that the backup optional functionality of an intelligent file system 340 is used only as an example in this description to illustrate one type of optional function that may be supported by an intelligent file system 340 and which may be invoked using the extended filename mechanisms of the illustrative embodiments. With that example backup optional functionality, a backup operation is performed prior to permitting access to file. The extended filename for specifying this option is of the type "[backup]xyz.txt." The optional function is performed by invoking corresponding option operating code 346 which operates by first deleting any existing backup file for the identified file being accessed (e.g., "xyz.txt-backup"), copying the file (e.g., "xyz.txt") to the backup file location (e.g., "xyz.txt-backup"), and then performing the access operation on the file xyz.txt. Many other types of optional functionality that is either known or may be later developed, may be invoked using the extended filename mechanisms without departing from the spirit and scope of the illustrative embodiments.

For example, other optional functions implemented in option operation codes 346 that may be provided by the intelligent file system 340 in addition to, or in replacement of, the backup optional functionality described above, may include a sequenced backup operation, specified by an extended filename of the type "[backup, sequence, limit=5] xyz.txt". With this example option function, a sequenced backup operation is performed before permitting the access to the file by copying xyz.txt-bkp00004 to xyz.txt-bkp00005 if it exists, then zyz.txt-bkp00003 to xyz.txt-bkp00004, and so on until copying xyz.txt to xyz.txt-bkp00001. The limit parameter specifies the number of backup files to keep. Once this sequenced backup operation is performed, then the file access operation is performed on the specified file.

As another example, an encrypt on write option may be specified in an extended filename using a format such as "[encrypt, password=bob]xyz.txt." This option would cause the file to be encrypted when it is written to and the encryption will use the password "bob" as specified in the parameter set forth in the extended filename. Similarly, another example option may be a decrypt on read option that may be specified in the extended filename using a format such as "[decrypt, password=bob]xyz.txt". In this case, the file will be decrypted when the file is read using the password bob.

The various possible options that may be implemented using the mechanisms of the illustrative embodiments are too numerous to set forth in this description. Suffice it to say that any such options as may be apparent to those of ordinary skill in the art in view of the present description may be used with the mechanisms of the illustrative embodiments without departing from the spirit and scope of the illustrative embodiments. To illustrate this, and to provide even further examples of other options that may be used with the mechanisms, consider the following list of extended filename formats and their corresponding option functionality:

---

"[crlf_to_lf]xyz.txt"   *converts Windows end of line markers to UNIX style automatically.
"[language=greek]xyz.txt"   *translates to a specific language or chooses a specific language file (such as "file.txt-greek").
"[encoding=utf-8]xyz.txt"   * translates from (for example) Unicode UCS-32 to UTF-8 format for applications that require a specific format.
"[notify-on-save]xyz.txt"   *sends email notifications (to parties that have registered an interest in the file) when the file is closed.
[auto-compile]xyz.c   *compiles the C program automatically when it is close (ideal for continuous integration).
[make-resident]xyz.txt   *brings the file back from offline storage if it has been archived.

---

The set of options that may be invoked using the extended filenames and the mechanisms of the illustrative embodiments are only limited by the option functionality supported by the particular intelligent file system 340 in which the mechanisms of the illustrative embodiments are implemented. It should be noted that such optional functionality of the intelligent file system 340 may be added dynamically to the intelligent file system 340 and the mechanisms of the illustrative embodiments will still function in that all that is needed for the dynamically added optional functionality to be utilized is to specify its identifier in the extended filename. No new APIs or user commands are necessary to implement the new optional functionality of the intelligent file system 340.

Thus, as a result of implementing the mechanisms of the illustrative embodiments, one is not tied to a predefined set of options or actions specifiable by standard or established commands/APIs. If the intelligent file system 340 supports a particular option or action, then they may be invoked using the extended filename and the mechanisms of the illustrative embodiments. This gives existing commands and APIs additional functionality and different capabilities than previously possible using the structured and limited approach of the prior art mechanisms.

Furthermore, in some illustrative embodiments, the options specified in the extended filename may be implemented using option operation code 346 provided in a virtual file system that may sit as an additional layer atop the "real" file system. That is, intelligent file system 340 may be a combination of a virtual file system and a conventional file system. In such a case, the conventional file system need not be modified in any way. The virtual file system may be modified to incorporate the parser 342, option determination logic 344, and option operation code 346 and may perform the various operations discussed above with regard to these elements while the conventional file system may support the file access operations via file access operation code 346, for example. This allows an existing file system to be extended to include additional option functionality that is not otherwise supported by the existing file system. Thus, as a result of the mechanisms of the illustrative embodiments, the functionality of existing file systems may be extended by including additional options not previously supported and then invoking those options using extended filenames and the mechanisms for parsing and correlating the option identifiers in these extended filenames to option operation code provided in the extended (now intelligent) file system.

Figure 4:
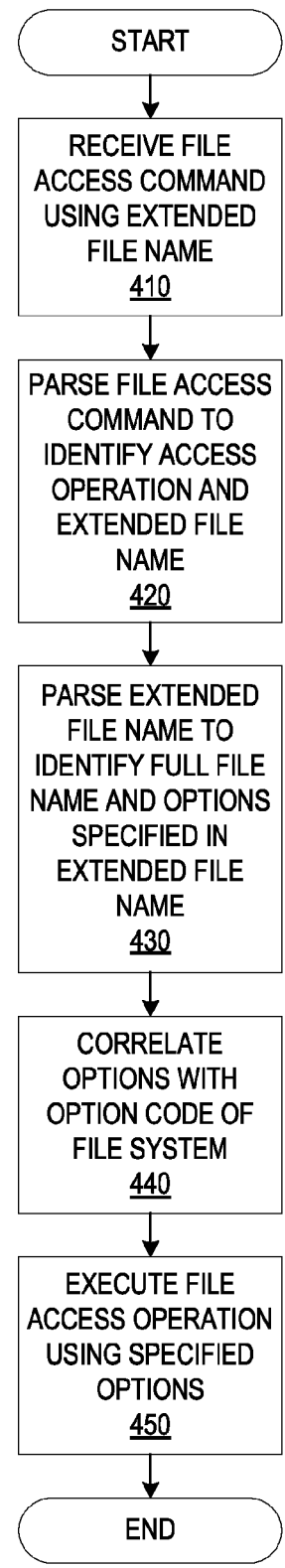
FIG. 4 is a flowchart outlining an example operation for parsing and executing a file system access operation in accordance with one illustrative embodiment.

FIG. 4 is a flowchart outlining an example operation for parsing and executing a file system access operation in accordance with one illustrative embodiment. As shown in FIG. 4, the operation starts by receiving a file access command that includes an extended filename such as described previously (step 410). The extended filename includes the full filename string and may optionally include one or more option identifier strings and corresponding parameter strings. The file access command is parsed to identify the access operation and the extended filename (step 420). The extended filename is then parsed to identify the full filename and the options (and their associated parameters) specified in the extended filename (step 430). As discussed above, this parsing may be done based on designated separator characters and a known convention of the file system for specifying placement of the full filename (e.g., either before or after the option identifier strings).

The option identifier strings identified by the parser are then correlated with the option code of the file system (step 440) and the file access operation is performed using the specified options as implemented by the option code (step 450). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing a file of a physical storage device of the data processing system via an intelligent file system associated with the physical storage device, comprising:

receiving, in the intelligent file system of the data processing system, a file access command specifying a file access operation and an extended filename, wherein the extended filename comprises a full filename and one or more options multiplexed with the full filename, and wherein the file access command is a command for accessing an actual file on the physical storage device of the data processing system;

parsing, by the intelligent file system, the file access command to identify the file access operation, the full filename, and the one or more options; and executing, by the intelligent file system, the file access operation on the file of the physical storage device corresponding to the full filename using the one or more options specified in the extended filename, wherein the intelligent file system provides at least one extended function that is not able to be invoked by performing file access operation calls to an operating system of the data processing system or by performing file access operation calls to standard libraries of the data processing system, and wherein at least one option of the one or more options specified in the extended filename invoke the extended function of the intelligent file system.

2. The method of claim 1, wherein the receiving, parsing, and executing operations are performed at a device driver level.

3. The method of claim 1, wherein the one or more options specified in the extended filename comprise at least one option that is not supported by an operating system executing on the data processing system.

4. The method of claim 1, wherein the one or more options specified in the extended filename comprise at least one option that is not supported by a standard library function call of the data processing system.

5. The method of claim 1, wherein the one or more options comprise an operation to be performed either before or after performing the access operation on the file.

6. The method of claim 5, wherein the operation is a backup operation for backing up the file prior to or after the access operation is performed on the file.

7. The method of claim 5, wherein the operation is a data format conversion operation for converting a format of the data of the file from a first format to a second format, different from the first format.

8. The method of claim 1, wherein the one or more options are specified by a user by including the one or more options in the extended filename.

9. The method of claim 1, wherein at least one option of the one or more options further comprises one or more parameters for implementing the at least one option, and wherein the one or more parameters are specified as part of the at least one option in the extended filename.

10. A computer program product comprising a computer readable storage device having a computer readable program stored therein, wherein the computer readable program, when executed on a data processing system, causes the data processing system to:

receive, in an intelligent file system of the data processing system, a file access command specifying a file access operation and an extended filename, wherein the extended filename comprises a full filename and one or more options multiplexed with the full filename, and wherein the file access command is a command for accessing an actual file on the physical storage device of the data processing system;

parse, by the intelligent file system, the file access command to identify the file access operation, the full filename, and the one or more options; and execute, by the intelligent file system, the file access operation on the file of the physical storage device corresponding to the full filename using the one or more options specified in the extended filename, wherein the intelligent file system provides at least one extended function that is not able to be invoked by performing file access operation calls to an operating system of the data processing system or by performing file access operation calls to standard libraries of the data processing system, and wherein at least one option of the one or more options specified in the extended filename invoke the extended function of the intelligent file system.

11. The computer program product of claim 10, wherein the computer readable program causes the data processing system to perform the receive, parse, and execute operations at a device driver level.

12. The computer program product of claim 10, wherein the one or more options specified in the extended filename comprise at least one option that is not supported by an operating system executing on the data processing system.

13. The computer program product of claim 10, wherein the one or more options specified in the extended filename comprise at least one option that is not supported by a standard library function call of the data processing system.

14. The computer program product of claim 10, wherein the one or more options comprise an operation to be performed either before or after performing the access operation on the file.

15. The computer program product of claim 14, wherein the operation is one of:
 a backup operation for backing up the file prior to or after the access operation is performed on the file; or
 a data format conversion operation for converting a format of the data of the file from a first format to a second format, different from the first format.

16. The computer program product of claim 10, wherein the one or more options are specified by a user by including the one or more options in the extended filename.

17. The computer program product of claim 10, wherein at least one option of the one or more options further comprises one or more parameters for implementing the at least one option, and wherein the one or more parameters are specified as part of the at least one option in the extended filename.

18. An apparatus, comprising:
 a processor; and
 at least one physical storage device coupled to the processor, wherein the processor implements an intelligent file system associated with the at least one physical storage device, and wherein the intelligent file system:
 receives a file access command specifying a file access operation and an extended filename, wherein the extended filename comprises a full filename and one or more options multiplexed with the full filename, and wherein the file access command is a command for accessing an actual file on the physical storage device of the data processing system;
 parses the file access command to identify the file access operation, the full filename, and the one or more options; and
 executes the file access operation on the file of the physical storage device corresponding to the full filename using the one or more options specified in the extended filename, wherein the intelligent file system provides at least one extended function that is not able to be invoked by performing file access operation calls to an operating system of the data processing system or by performing file access operation calls to standard libraries of the data processing system, and wherein at least one option of the one or more options specified in the extended filename invoke the extended function of the intelligent file system.

* * * * *